US 6,557,876 B2

(12) United States Patent  
Saiki et al.

(10) Patent No.: US 6,557,876 B2
(45) Date of Patent: May 6, 2003

(54) FRONT FENDER DEVICE FOR MOTORCYCLE

(75) Inventors: Terunari Saiki, Saitama (JP); Kenji Mutou, Saitama (JP); Mamoru Otsubo, Saitama (JP); Hideaki Yamazumi, Saitama (JP); Toshiteru Yamamoto, Saitama (JP); Kazuro Furukawa, Saitama (JP); Toshinobu Fujii, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 45 days.

(21) Appl. No.: 09/784,059

(22) Filed: Feb. 16, 2001

(65) Prior Publication Data

US 2001/0008334 A1 Jul. 19, 2001

Related U.S. Application Data

(62) Division of application No. 09/151,295, filed on Sep. 11, 1998, now Pat. No. 6,217,048.

(30) Foreign Application Priority Data

Sep. 11, 1997 (JP) ............................................. 9-246816

(51) Int. Cl.$^7$ ............................................. B62D 25/14
(52) U.S. Cl. ................... 280/152.1; 280/152.2
(58) Field of Search .......................... 280/152.1, 152.2, 280/304.3, 852; 293/104, 105; D12/114, 118

(56) References Cited

U.S. PATENT DOCUMENTS

| | | | | |
|---|---|---|---|---|
| 481,053 | A | * 8/1892 | Owen | 280/274 |
| 511,405 | A | * 12/1893 | Cable | 280/152.1 |
| D158,960 | S | * 6/1950 | Harley | D12/117 |
| 3,934,900 | A | * 1/1976 | Wilson | 280/152.3 |
| D242,913 | S | * 1/1977 | Petty | D12/186 |
| 4,458,909 | A | * 7/1984 | Morioka | 280/279 |
| D279,974 | S | * 8/1985 | Komori et al. | D12/186 |
| D298,224 | S | * 10/1988 | Yamada et al. | D12/186 |
| RE34,072 | E | * 9/1992 | Asakura et al. | 180/68.3 |
| 5,299,832 | A | 4/1994 | Price, Sr. | |
| D383,106 | S | * 9/1997 | Rice | D12/186 |
| 5,775,454 | A | 7/1998 | Scherbarth et al. | |
| D409,539 | S | * 5/1999 | Hanlon et al. | D12/186 |

* cited by examiner

Primary Examiner—Robert P. Olszewski
Assistant Examiner—James S. McClellan
(74) Attorney, Agent, or Firm—Birch, Stewart, Kolasch & Birch, LLP

(57) ABSTRACT

To provide a front fender device for a motorcycle in which a front fender extending on front and rear sides of a front fork is mounted on the front fork in such a manner as to cover an upper side of the front wheel. The device is intended to increase the degree of freedom in design while minimizing an increase in weight and reducing vibration and noise from the front fender. Garnishes are mounted on each of right and left outer surfaces of a front fender at a plurality of positions spaced in the longitudinal direction of the front fender with elastic members inserted between the front fender and the garnishes.

14 Claims, 10 Drawing Sheets

FRONT FENDER DEVICE FOR MOTORCYCLE

This application is a divisional of application Ser. No. 09/151,295, filed on Sep. 11, 1998 now U.S. Pat. No. 6,217,048 contents of which are hereby incorporated by reference and for which priority is claimed under 35 U.S.C. §120; and this application claims priority of application Ser. No. 9-246816 filed in Japan on Sep. 11, 1997 under 35 U.S.C. §119.

BACKGROUND OF THE INVENTION

1. Field of the Invention

The present invention relates to a motorcycle having a front fender extending on front and rear sides of a front fork. The front fork supports a front wheel thereon, the front fender being mounted on the front fork in such a manner as to cover an upper side of the front wheel. Specifically, the present invention is drawn to an improved structure of the front fender.

2. Description of Related Art

A front fender is constructed by forming a sheet member such as steel sheet into an approximately U-shape opened on the front wheel side in cross section. The front fender is mounted on the front fork in such a manner as to cover an upper side of the front wheel. The rigidity of such a front fender in the longitudinal direction of the front fender is not large because the front fender extends on the front and rear sides of the front fork. As a result, there may occur vibration of the front fender by a road surface and/or collision with small stones, etc. picked up by the front wheel upon running of the motorcycle. Furthermore, noise due to the vibration can be very high. To reduce such vibration and noise, attempts have been made to increase the thickness of a front fender or provide a stay for increasing a supporting strength of a front fender in addition to a stay for mounting the front fender to a front fork.

The structure in which the thickness of a front fender is increased for reducing vibration and noise of the front fender is disadvantageous in that the weight of the front fender itself, and therefore, the total weight of the motorcycle is increased. The structure employing a stay for increasing a supporting strength in addition to a stay for mounting the front fender to a front fork is disadvantageous in that the degree of freedom in design is restricted because a clearance between the front fender additionally provided with the stay and a front wheel must be suitably ensured.

SUMMARY OF THE INVENTION

In view of the foregoing, an object of the present invention is to provide a front fender device for a motorcycle, which is capable of increasing the degree of freedom in design while suppressing an increase in weight and reducing vibration and noise.

To achieve the above object, according to the present invention, there is provided a front fender device for a motorcycle in which a front fender extending on front and rear sides of a front fork, which rotatably supports a front wheel, is mounted on the front fork in such a manner as to cover an upper side of the front wheel. A garnish is mounted on each of the right and left outer surfaces of the front fender at a plurality of positions spaced in the longitudinal direction of the front fender with elastic members inserted between the garnish and the front fender.

With this configuration, since a plurality of the elastic members and garnishes constitute dynamic dampers, it is possible to suppress vibration of the front fender and also noise due to the vibration. Furthermore, since the elastic members and garnishes are disposed on part of the right and left outer surfaces of the front fender, it is possible to only minimally increase the weight of the front fender. Furthermore, the construction of the present invention ensures that there is a sufficient clearance between the front fender and the front wheel, increasing the degree of freedom in design, and improving the external appearance of the front fender by provision of the garnishes.

According to the present invention, there is provided a front fender device for a motorcycle in which a front fender extends on front and rear sides from a front fork, which rotatably supports a front wheel, is mounted on the front fork in such a manner as to cover an upper side of the front wheel. A projection projecting on an outer surface side of the front fender is provided on each of the right and left sides of the front fender in such a manner as to extend in the longitudinal direction of the front fender. The projection is formed by recessing a corresponding portion on an inner surface side of the front fender.

With this configuration, since the projections are formed on the right and left sides of the front fender, it is possible to enhance the rigidity of the front fender in the longitudinal direction while limiting an increase in weight. Furthermore, vibration of the front fender and noise due to the vibration are suppressed. Since the projections are formed by recessing the corresponding portions on an inner surface side of the front fender, it is possible to sufficiently ensure a clearance between the front fender and the front wheel and therefore increase the degree of freedom in design.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Hereinafter, embodiments of the present invention will be described with reference to the accompanying drawings.

Figure 1:
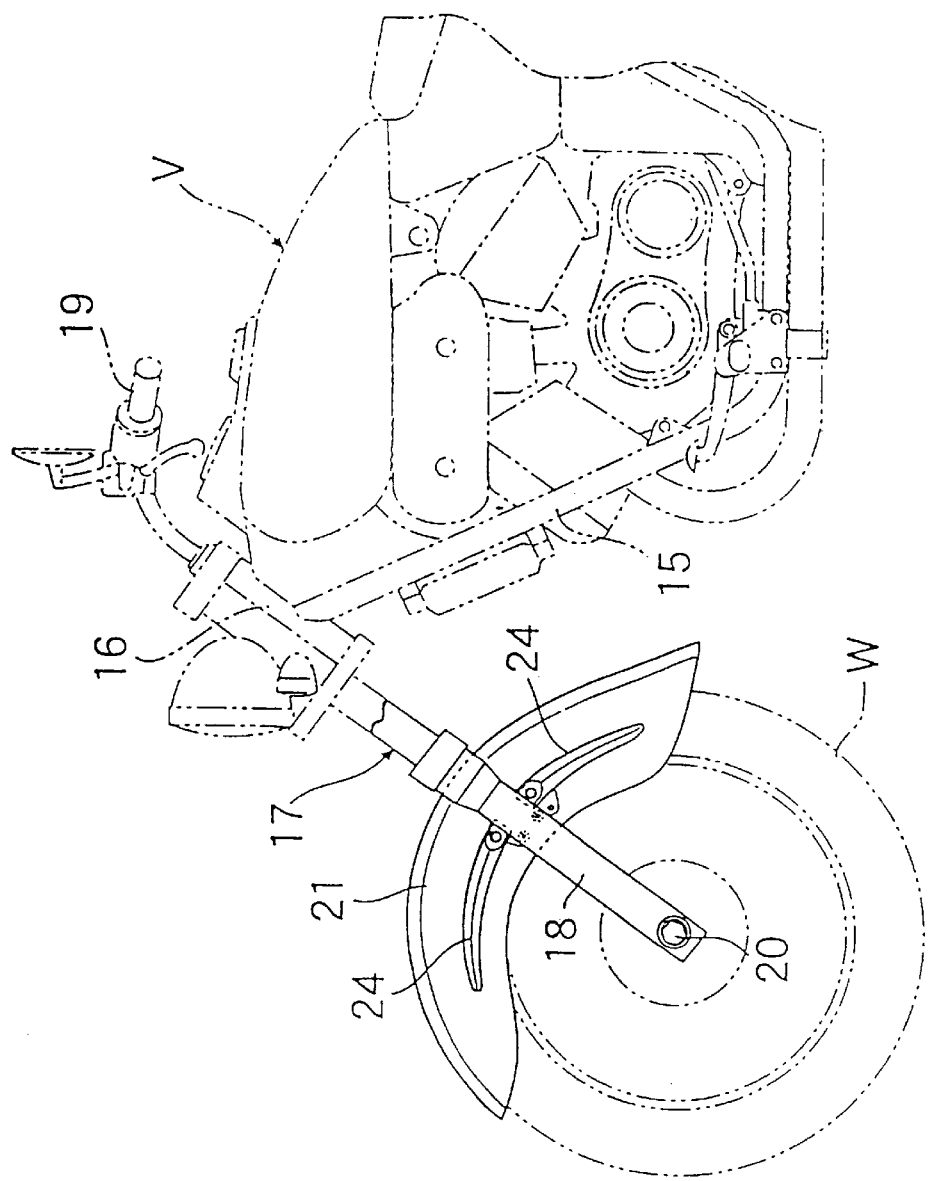
FIG. 1 is a side view of a front portion of a motorcycle in a first embodiment of the present invention.

FIGS. 1 to 12 show a first embodiment of the present invention. Referring first to FIG. 1, a vehicular body 15 of a motorcycle V has at its front end a head pipe 16 by means of which a front fork 17 is steerably supported. A steering handlebar 19 is mounted on an upper end of the front fork 17. The front fork 17 has on its lower side, telescopic type suspension units 18 disposed on both sides of a front wheel W. An axle 20 of the front wheel W is supported by lower ends of the suspension units 18.

Figure 2:
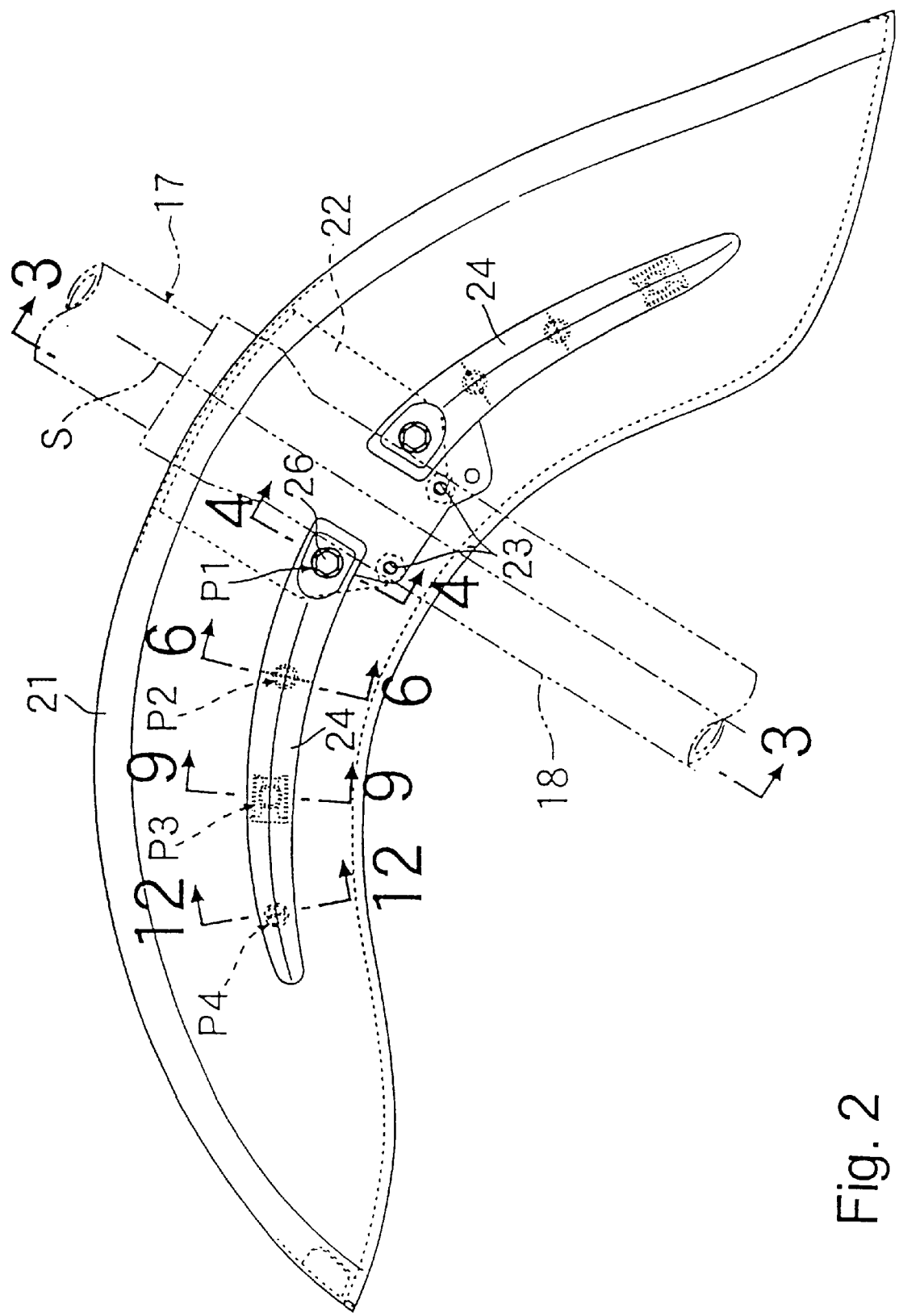
FIG. 2 is an enlarged side view of a front fender.
Figure 3:
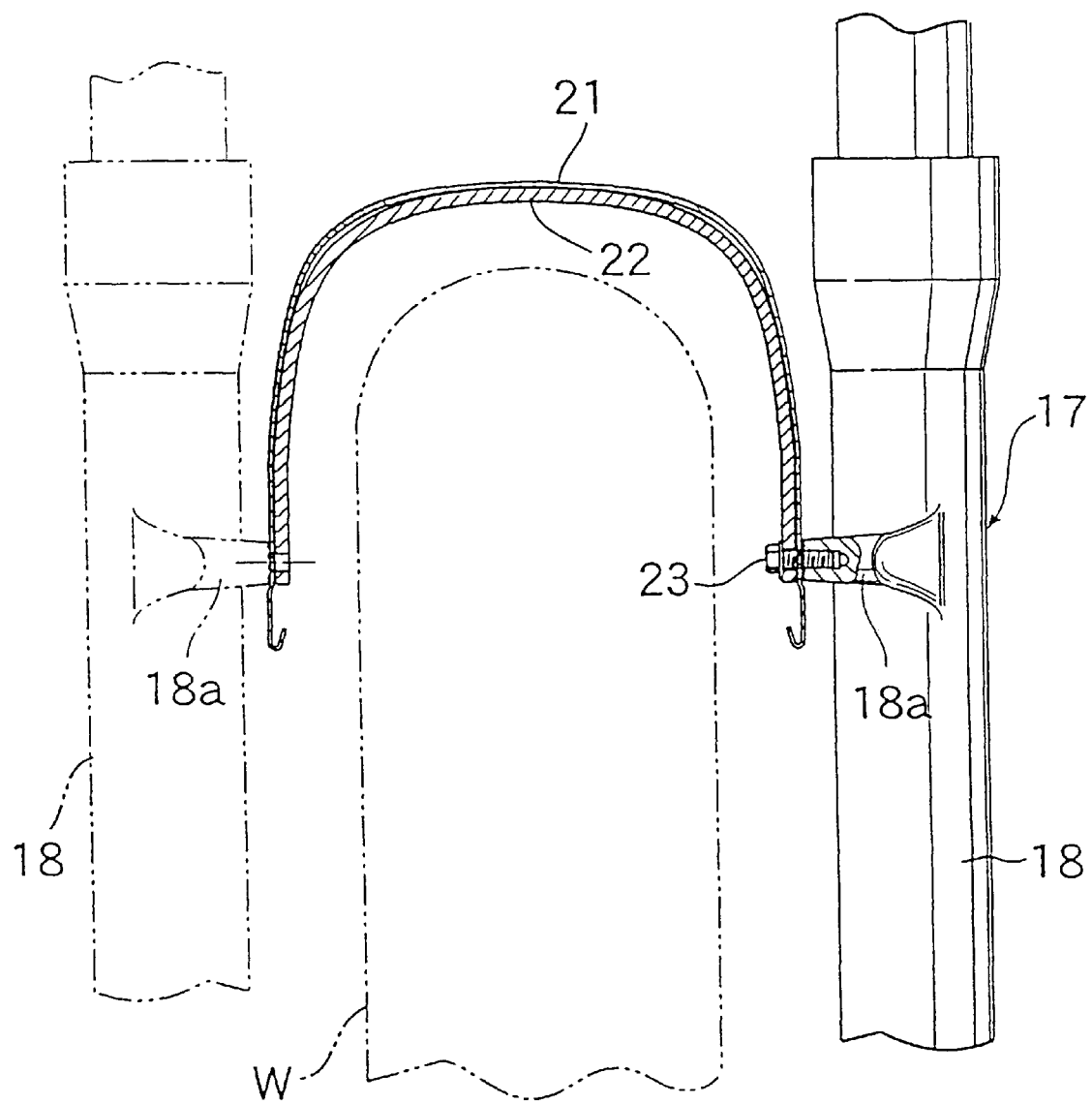
FIG. 3 is a sectional view taken on line 3—3 of FIG. 2.

Referring to FIGS. 1, 2 and 3, a front fender 21 for covering an upper side from the front wheel W is mounted on both the suspension units 18 of the front fork 17 in such a manner as to extend on front and rear sides of the front fork 17.

The front fender 21 is constructed by pressing a sheet member such as a steel sheet into an approximate U-shape, having an opening on the front wheel side in cross section. The front fender 21 is mounted on the front fork 17 by means of a steel stay 22 having a cross-sectional shape substantially corresponding to an inner surface of the front fender 21. Each of the right and left suspension units 18 of the front fork 17 has, at two positions spaced fore and aft, a pair of bosses 18a projecting inward toward the front wheel W. The outer surface of an intermediate portion of the front fender 21 in the longitudinal direction is brought into contact with leading ends of the bosses 18a. The stay 22 is overlapped, at portions corresponding to both the suspension units 18, onto an inner surface of the front fender 21. Bolts 23 passing through the stay 22 and the front fender 21 from inside of the stay 22 are screwed in the bosses 18a, whereby the front fender 21 is mounted on the front fork 17.

A pair of garnishes 24 having the same shape are mounted on each of right and left outer surfaces of the front fender 21 at positions substantially symmetric to each other with respect to a plane S passing through the axial lines of both the suspension units 18.

The garnish 24, extending relatively longer in the longitudinal direction of the front fender 21, is basically formed into an approximately V-shape opened toward the front fender 21 in cross section. The garnish 24 is supported on the front fender 21 at a plurality of positions spaced in the longitudinal direction of the front fender 21. For example, four positions: a first supporting position P1 relatively closer to the suspension unit 18, and second, third and fourth supporting positions P2, P3 and P4 arranged in this order from the first supporting position P1 to the side remote from the suspension unit 18.

Figure 4:
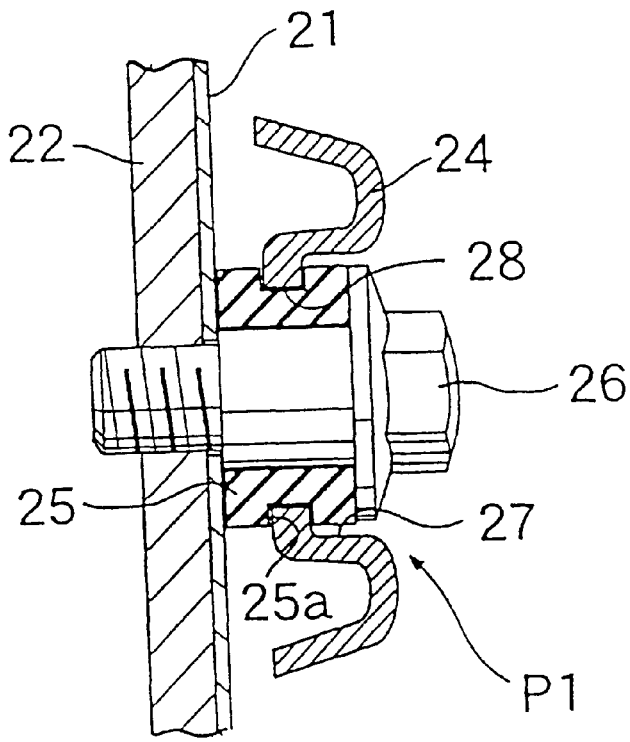
FIG. 4 is a sectional view taken on line 4—4 of FIG. 2.
Figure 5:
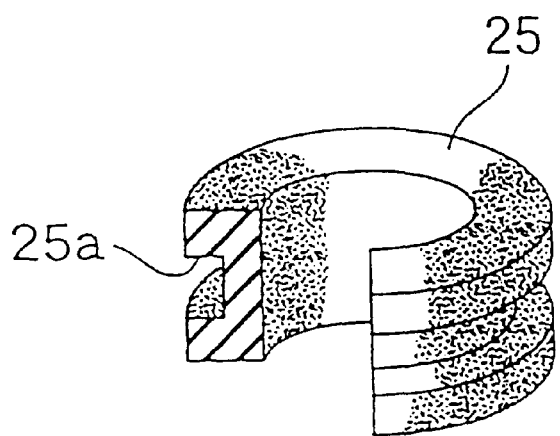
FIG. 5 is a cutaway view in perspective of a rubber mount.

Referring to FIGS. 4 and 5, at the first supporting position P1, a rubber mount 25 as an elastic member is mounted on the outer surface of the front fender 21 with a bolt 26 screwed in the stay 22. The garnish 24 is supported on the front fender 21 through the rubber mount 25.

The rubber mount 25 is formed into a cylindrical shape having on its outer surface an annular engagement groove 25a. The bolt 26 passes through the rubber mount 25 and the front fender 21 and is screwed into the stay 22. Furthermore, the garnish 24 has a recess 27 curved inward toward the front fender 21 and an engagement hole 28 continuous with the recess 27 by way of a stepped portion. A diameter of the engagement hole 28 is set to be smaller than an outside diameter of the rubber mount 25 but larger than a diameter of the engagement groove 25a at the blocking end. A peripheral edge of the engagement hole 28 portion is engaged in the engagement groove 25a of the rubber mount 25.

Figure 6:
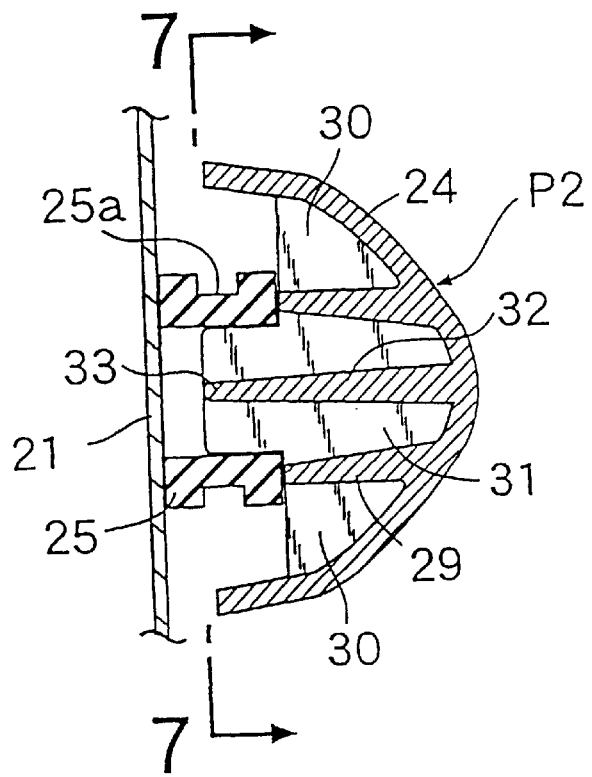
FIG. 6 is a sectional view taken on line 6—6 of FIG. 2.
Figure 7:
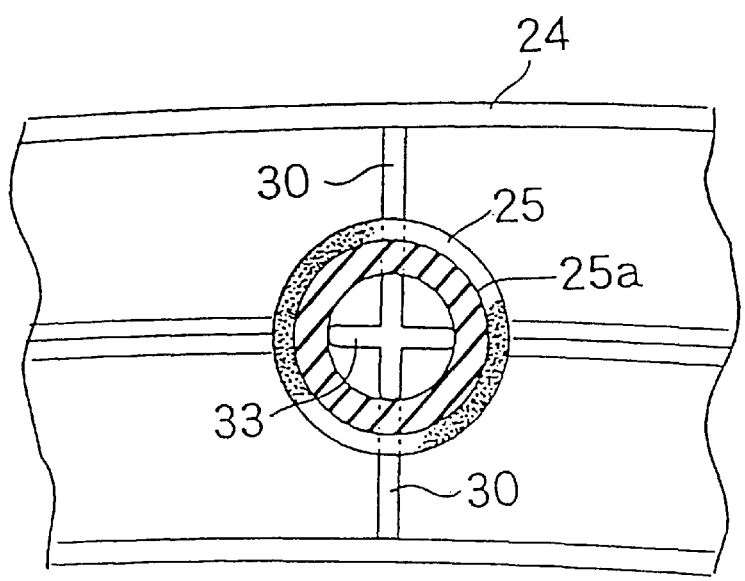
FIG. 7 is a sectional view taken on line 7—7 of FIG. 6.
Figure 8:
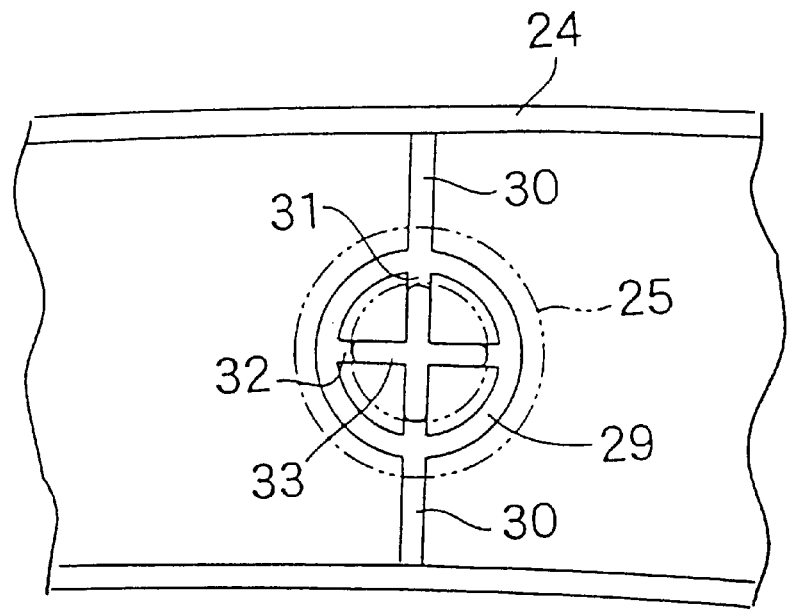
FIG. 8 is a sectional view, similar to FIG. 7, with the rubber mount omitted.

Referring to FIGS. 6 to 8, the garnish 24 has, on its inner surface, at a position corresponding to the second supporting position P2, a supporting portion 29, reinforcing ribs 30, 31 and 32, and a fitting portion 33. The supporting portion 29 is formed into a cylindrical shape at a central portion of the garnish 24 in the width direction. The reinforcing ribs 30 extend on both sides of the supporting portion 29 in the width direction of the garnish 24. The reinforcing rib 31 extends on a single diameter line of the supporting portion 29 along the reinforcing ribs 30 and is continuous at both ends onto an inner surface of the supporting portion 29. The reinforcing rib 32 crosses the reinforcing rib 31 and is continuous at both ends onto the inner surface of the supporting portion 29. The fitting portion 33 is formed into a cross-shape continuous to the reinforcing ribs 31 and 32 and projects from the supporting portion 29. The supporting portion 29 is brought into contact with one end of the rubber mount 25 with the other end being in contact with the outer surface of the front fender 21. The fitting portion 33 is fitted in the rubber mount 25. As a result, at the second supporting position P2, the garnish 24 is supported on the outer surface of the front fender 21 through the rubber mount 25.

Figure 9:
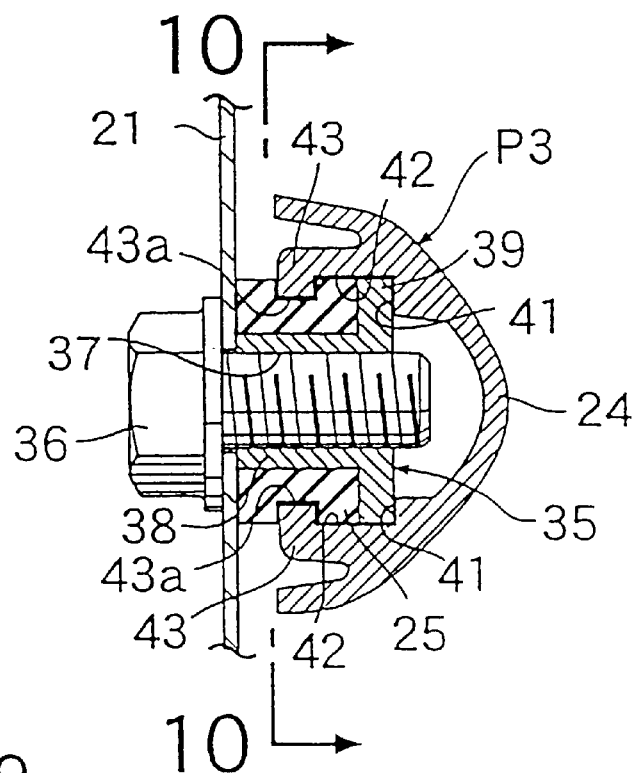
FIG. 9 is a sectional view taken on line 9—9 of FIG. 2.
Figure 10:
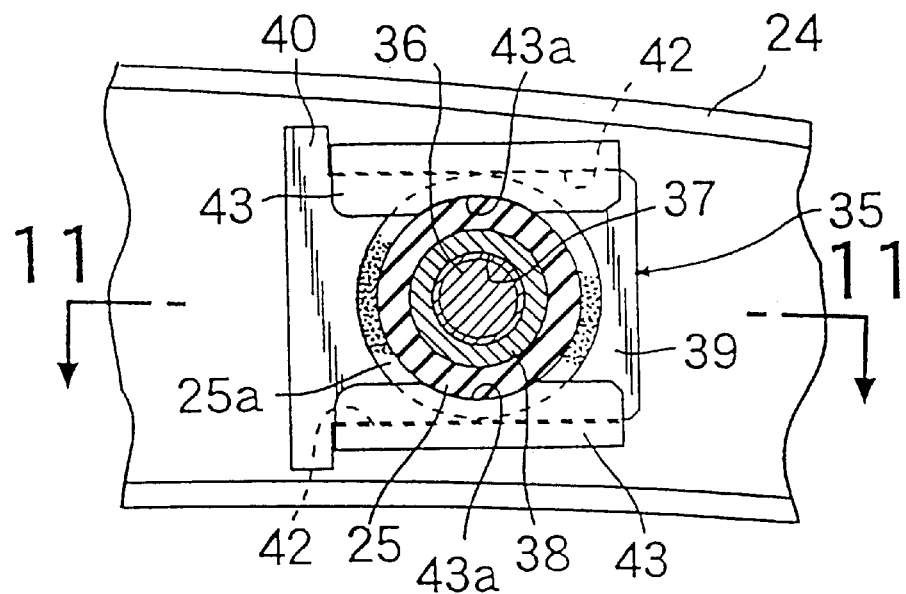
FIG. 10 is a sectional view taken on line 10—10 of FIG. 9.
Figure 11:
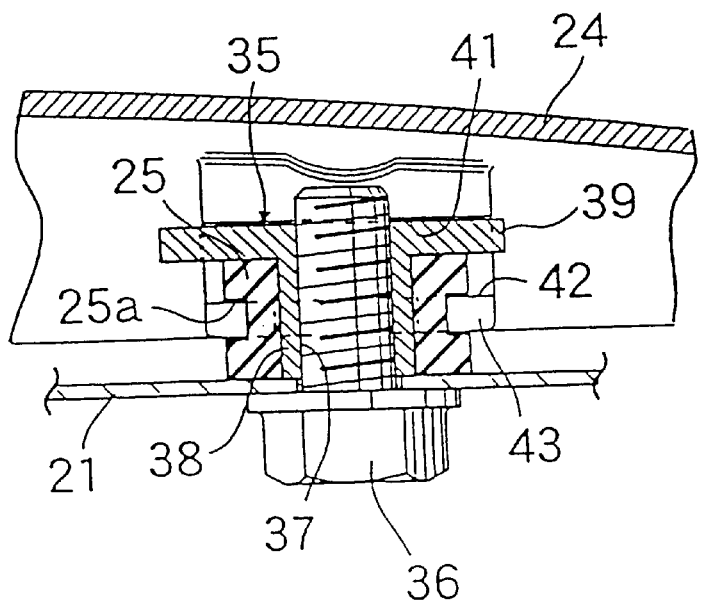
FIG. 11 is a sectional view taken on line 11—11 of FIG. 10.

Referring to FIGS. 9 to 11, at the third supporting position P3, the rubber mount 25 is mounted on the outer surface of the front fender 21 with both a mounting member 35 and a bolt 36 screwed in the mounting member 35. The garnish 24 is supported on the front fender 21 through the rubber mount 25.

The mounting member 35 includes a cylinder 38, a guide plate 39, and a restricting flange 40. The cylinder 38, through which the rubber mount 25 passes, has on its inner surface an internal thread 37. The guide plate 39 is brought in contact with one end of the cylinder 38 with the other end being in contact with the outer surface of the front fender 21 while holding the rubber mount 25 between the outer surface of the front fender 21 and the guide plate 39. The restricting flange 40 projects in the width direction on both sides from an end portion of the guide plate 39 on the fourth supporting position P4 side. To be more specific, the guide plate 39 is formed into a rectangular flat shape extending on the sides of the second and fourth supporting positions P2 and P4 from the cylinder 38 and also extending on both sides of the garnish 24 in the width direction from the cylinder 39.

The bolt 36 passes through the front fender 21 from the inner side thereof and is screwed in the internal thread 37, so that the rubber mount 25 is mounted on the outer surface of the front fender 21.

Furthermore, the garnish 24 has, on its inner surface, a pair of supporting faces 41 and guide arms 43 respectively extending in the longitudinal direction of the garnish 24. The supporting faces 41 are disposed opposite to both side outer surfaces of the guide plate 39 of the mounting member 35. Each guide arm 43 is formed into an approximate L-shape so that a guide groove 42 is formed between the supporting face 41 and the guide arm 43. Leading ends of the guide arms 43 are engageable in the engagement groove 25a of the rubber mount 25. To be more specific, the guide arms 43 are engaged in the engagement groove 25a of the rubber mount 25 in a state in which both sides of the guide plate 39 and part of the rubber mount 25 are slidably fitted in the guide grooves 42. The leading ends of the guide arms 43 have circular-arc fitting recesses 43a. The fitting recesses 43a allow the guide arms 43 to be elastically fitted in the engagement groove 25a when the restricting flange 40 of the mounting member 35 is brought in contact of the end portions of both the guide arms 43.

At the third supporting position P3, the garnish 25 is supported on the front fender 21 while being fixed in both the longitudinal and width directions.

Figure 12:
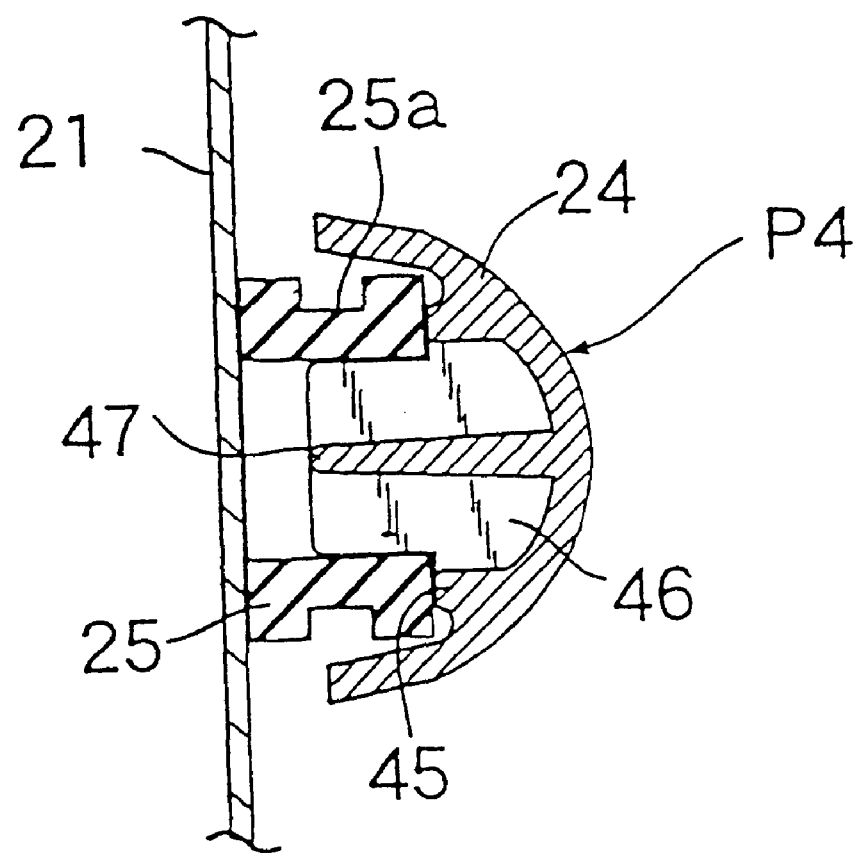
FIG. 12 is a sectional view taken on line 12—12 of FIG. 2.

Referring to FIG. 12, the garnish 24 has, on its inner surface at a position corresponding to the fourth supporting position P4, a supporting portion 45, a reinforcing rib 46, and a fitting portion 47. The supporting portion 45 is formed into a cylindrical shape at a central portion of the garnish 24 in the width direction. The reinforcing rib 46 is formed into an approximate cross-shape and is continuous with an inner surface of the supporting portion 45. The fitting portion 47 is formed into a cross-shape and is continuous with the reinforcing rib 46. The fitting portion 47 is fitted in the rubber mount 25 when the supporting portion 45 is brought into contact with one end of the rubber mount 25 with the other end in contact with the outer surface of the front fender 21. At the fourth supporting position P4, the garnish 24 is thus mounted on the outer surface of the front fender 21 through the rubber mount 25.

A function of the first embodiment will be described below. On each of the right and left sides of the front fender 21, one pair of the garnishes 24 are each mounted at first to fourth supporting positions P1 to P4 spaced in the longitudinal direction of the front fender 21 with the rubber mounts 25 located between the garnishes 24 and the front fender 21. Each rubber mount 25 and the garnish 24 constitute a dynamic damper. Accordingly, even for the front fender 21 of a type extending on the front and rear sides of the front fork 17, the above dynamic dampers suppress vibration of the front fender 21 caused by a road surface and/or collision with small stones, etc. picked up by the front wheel W upon running of the motorcycle. Furthermore, noise due to the vibration is reduced as much as possible.

Since the rubber mounts 25 and the garnishes 24 are disposed on part of both side outer surfaces of the front fender 21, an increase in weight of the front fender 21 due to mounting of the rubber mounts 25 and the garnishes 24 is relatively small. Furthermore, since the inward projection of the front fender 21 due to mounting of the rubber mounts 25 and the garnish 24 is very small, a sufficient clearance can be ensured between the front fender 21 and the front wheel W. This is effective to increase the degree of freedom in design. Additionally, the external appearance of the front fender 21 is improved by provision of the garnishes 24.

Figure 13:
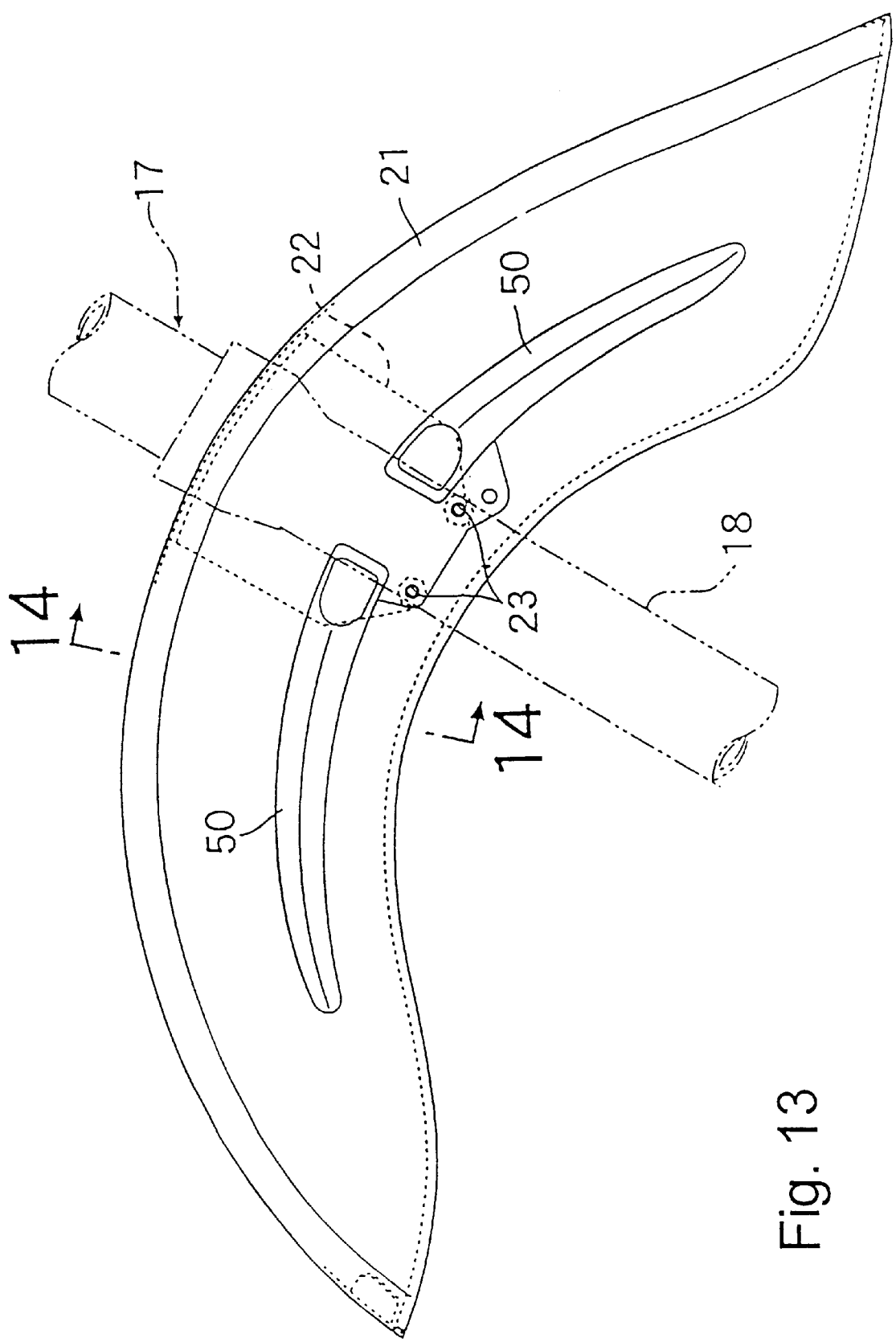
FIG. 13 is a side view of a front fender of a second embodiment of the present invention.
Figure 14:
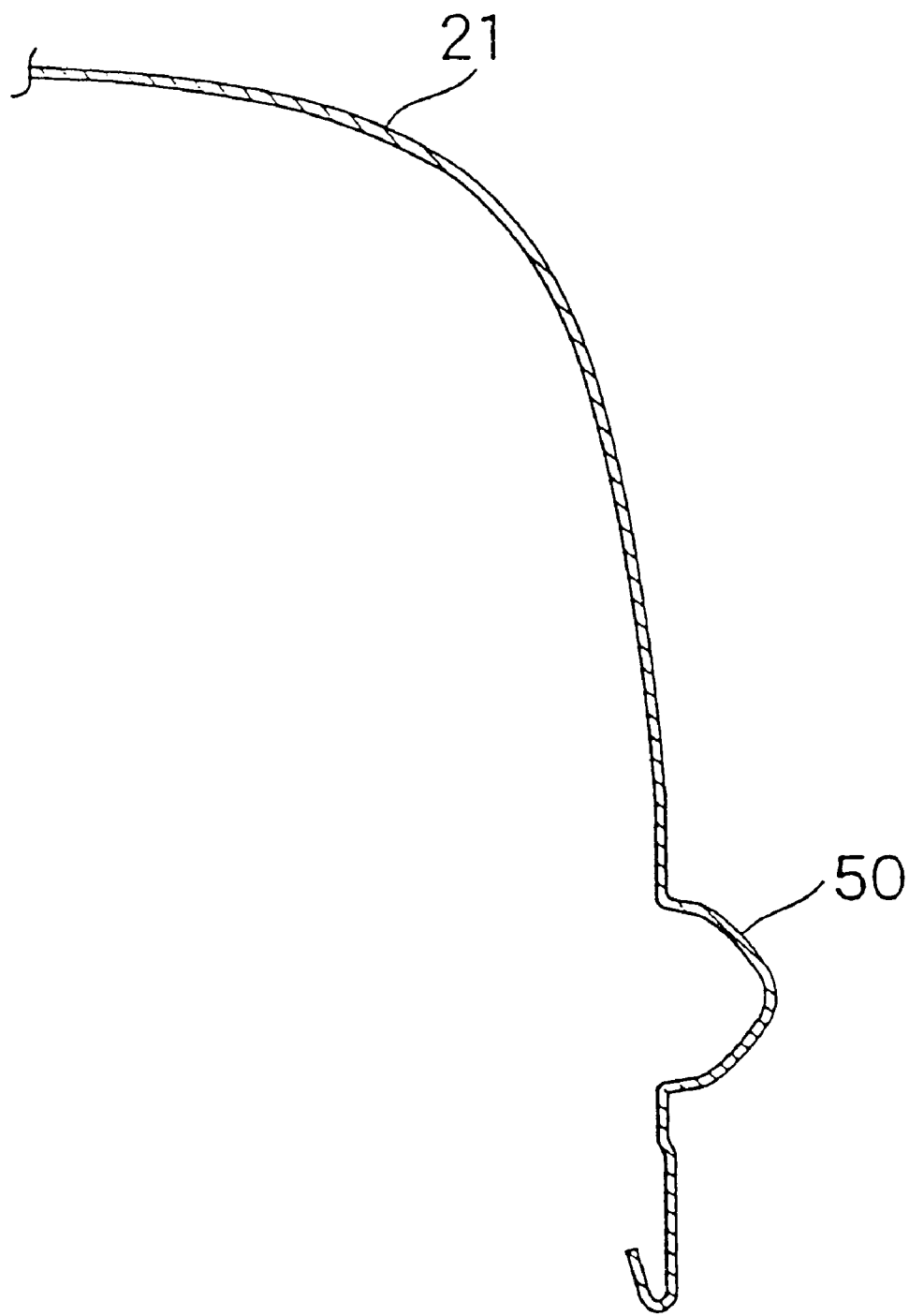
FIG. 14 is a sectional view taken on line 14—14 of FIG. 13.

FIGS. 13 and 14 show a second embodiment of the present invention. A front fender 21 is mounted on right and left suspension units 18 of a front fork 17 by means of a stay 22. A pair of projections 50 are formed on right and left sides of the front fender 21 in such a manner as to extend in the longitudinal direction of the front fender 21. The projection 50, projecting on the outer surface of the front fender 21, is formed by recessing a portion corresponding to the projection 50 on the inner surface of the front fender 21.

According to the second embodiment, it is possible to enhance the rigidity of the front fender 21 in the longitudinal direction while limiting an increase in weight of the front fender 21 by formation of the projections 50 on the right and left sides of the front fender 21. Furthermore, vibration of the front fender 21 and the occurrence of noise due to the vibration is reduced. Since the projections 50 are formed by recessing the corresponding portions on the inner surface of the front fender 21, it is possible to sufficiently ensure a clearance between the front fender 21 and the front wheel W. Therefore, the degree of freedom in design is increased.

While the embodiments of the present invention have been described in detail, such description is for illustrative purposes only, and it is to be understood that various changes in design may be made without departing from the scope of claims.

As described above, according to the present invention, since a plurality of the elastic members and garnishes constitute dynamic dampers, it is possible to reduce vibration and noise of the front fender while making a relatively small increase in weight of the front fender. Furthermore, a clearance between the front fender and the front wheel is ensured and the degree of freedom in design is increased. In addition, the external appearance of the front fender is improved by the provision of the garnishes.

According to the present invention, since the projections are formed on the right and left sides of the front fender, it is possible to enhance the rigidity of the front fender in the longitudinal direction while limiting an increase in weight and reducing vibration and noise of the front fender. Furthermore, a clearance between the front fender and the front wheel is ensured and the degree of freedom in design is increased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A front fender for a motorcycle, the motorcycle having a front fork for rotatably supporting a front wheel, the front fender mounted on and extending on front and rear sides of the front fork to cover an upper side of the front wheel, the front fender comprising:
    an upper portion;
    right and left side portions, said right and left side portions being connected to said upper portion at a junction; and
    a projection formed on an outer surface of said right and left portions of said front fender at a location below said junction, each of said projections extending in a longitudinal direction of said front fender, each of said projections being formed by recessing an inner surface of said front fender,
    wherein there are a pair of said projections on each of said right and left portions of said front fender, one projection extending from said front fork forwardly and another projection extending from said front fork rearwardly.

2. The front fender for a motorcycle according to claim 1, wherein each of said pair of projections on said right and left portions of said front fender are generally symmetric about an axis of the front fork.

3. The front fender according to claim 1, wherein a thickness of said front fender is generally uniform throughout an entire width thereof.

4. The front fender according to claim 1, wherein a thickness of said front fender is generally uniform throughout an entire length thereof.

5. The front fender according to claim 4, wherein a thickness of said front fender is generally uniform throughout an entire width thereof.

6. The front fender according to claim 1, wherein each of said projections is located adjacent a bottom of said right and left sides.

7. The front fender according to claim 1, wherein each of said pair of projections are spaced from each other in a longitudinal direction by a non-projected portion.

8. A vehicle, comprising:
- a vehicular body;
- a head pipe attached at a front end of said vehicular body;
- a front fork steerably supported by said head pipe;
- a handlebar mounted on an upper end of said front fork;
- a front wheel supported by lower ends of suspension units attached to said front fork; and
- a front fender supported by said front fork, said front fender including:
  - an upper portion;
  - right and left side portions, said right and left side portions being connected to said upper portion at a junction; and
  - a projection formed on an outer surface of said right and left portions of said front fender at a location below said junction, each of said projections extending in a longitudinal direction of said front fender, each of said projections being formed by recessing an inner surface of said front fender,
  - wherein there are a pair of said projections on each of said right and left portions of said front fender, one projection extending from said front fork forwardly and another projection extending from said front fork rearwardly.

9. The vehicle according to claim 8, wherein each of said pair of projections on said right and left portions of said front fender are generally symmetric about an axis of the front fork.

10. The vehicle according to claim 8, wherein a thickness of said front fender is generally uniform throughout an entire width thereof.

11. The vehicle according to claim 8, wherein a thickness of said front fender is generally uniform throughout an entire length thereof.

12. The vehicle according to claim 11, wherein a thickness of said front fender is generally uniform throughout an entire width thereof.

13. The vehicle according to claim 8, wherein each of said projections is located adjacent a bottom of said right and left sides.

14. The vehicle according to claim 8, wherein each of said pair of projections are spaced from each other in a longitudinal direction by a non-projected portion.

* * * * *